Sept. 10, 1946.   L. F. THIRY   2,407,588
SHOCK ABSORBER
Filed Dec. 4, 1944
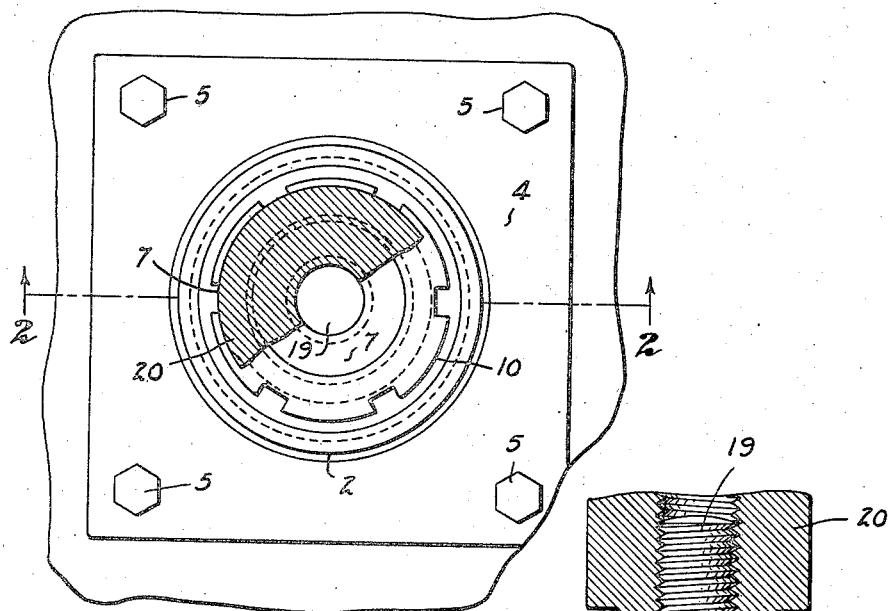
Fig. 1
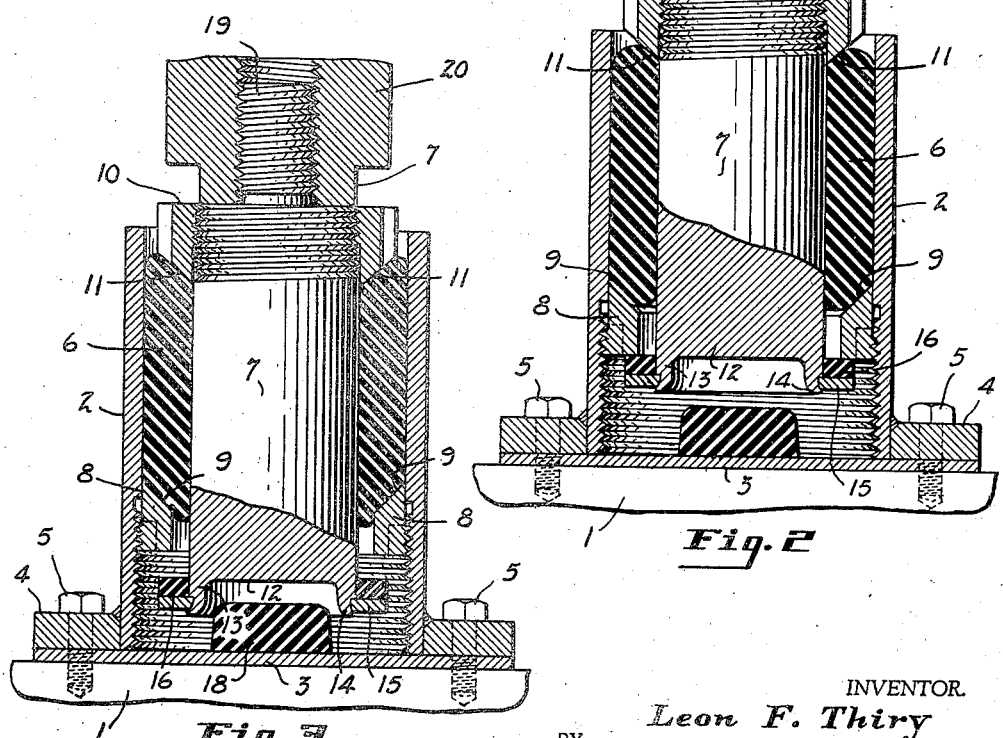
Fig. 2
Fig. 3
INVENTOR.
Leon F. Thiry
BY
Evans & McCoy
ATTORNEYS Patented Sept. 10, 1946

2,407,588

UNITED STATES PATENT OFFICE 2,407,588

SHOCK ABSORBER

Leon F. Thiry, Montclair, N. J., assignor to The General Tire & Rubber Company, Akron, Ohio, a corporation of Ohio Application December 4, 1944, Serial No. 566,419

5 Claims. (Cl. 248—358)

This invention relates to a shock absorbing and vibration dampening support which is of general application as a machine support, but which is particularly useful as a shock absorber for gun mounts.

The present invention has for an object to provide an improved mounting in which a tubular body of rubber which serves as the shock absorbing and vibration dampening element is in the form of a bushing held under strong radial pressure between the exterior of a post and the interior of a tubular standard and in which the tube and post carry confining shoulders engaging the ends of the tubular rubber body which serve to increase the resistance of the rubber body to relative axial movements of the post and tube in one direction and which are of a size and shape such that the rubber body has the deflection characteristics desirable for cushioning severe axial impacts.

A further object of the invention is to provide a shock absorber of the telescopic rubber bushing type that has cushion engaging elements of a character such that the rubber cushion may be put under an initial axial compression if desired.

Further objects of the invention are to provide a shock absorber of the character referred to with simple means for snubbing rebound and for snubbing overloads.

With the above and other objects in view, the invention may be said to comprise the support as illustrated in the accompanying drawing, hereinafter described and particularly set forth in appended claims, together with such variations and modifications thereof as will be apparent to one skilled in the art to which the invention pertains.

Reference should be had to the accompanying drawing forming a part of this specification, in which:

Fig. 1 is a plan view of a support embodying the invention;

Fig. 2 is a central vertical section taken on the line indicated at 2—2 in Fig. 1, and Fig. 3 is a section similar to Fig. 2, showing the overload carrying element depressed.

Referring to the accompanying drawing, the support of the present invention is shown mounted upon a suitable floor or base 1. The support comprises an upright tube 2, a base plate 3 upon which the tube rests and a mounting plate 4 which fits around the base of the tube and rests upon the plate 3. The plate 4 has a central opening to receive the tube 2 and may be welded to the exterior of the tube to form an attaching flange for the tube 2, which may be secured by suitable means such as bolts 5 to the plate 3 and base 1. Mounted within the tube 2 there is a cushioning body 6 of tubular form which is composed of an elastic material such as rubber or synthetic rubber mounted between the exterior of a post 7 and the interior of the tube 2. In order to subject the body 6 of rubber to a high degree of radial compression between the post and the tube the external diameter of the tubular body of rubber is greatly reduced in the process of placing it within the tube 2, a suitable method of assembling the rubber bushing between the post and sleeve being that disclosed in my Patent 1,739,270, granted December 10, 1929.

Beneath the cushioning sleeve 6 a lower confining ring 8 is secured in adjusted position to the interior of the tube 2. The ring 8 is preferably externally threaded and screwed into the lower end of the tube 2 so that it may be adjusted to the desired position within the tube. The ring 8 has an internal diameter greater than the external diameter of the post 7 so that the interior of the ring is radially spaced from the exterior of the post and only partially underlies the lower end of the cushioning body 6. The ring 8 has an internally beveled top face 9 which engages the lower end of the rubber cushioning body and provides a tapering space between the ring and post into which the rubber of the cushioning body may be forced when subjected to a downward thrust.

An upper internally threaded confining ring 10 is adjustably mounted upon the post 7 and has an externally beveled bottom face 11 which engages with the upper end of the rubber cushioning body and provides an upwardly tapering annular space between the ring and the tube 2 into which the rubber of the cushioning sleeve may be forced upon a downward movement of the post in the sleeve. The external diameter of the upper confining ring 10 is less than the internal diameter of the tube 2, so that the periphery of the ring 10 is spaced radially from the interior of the tube 2 and only partially overlies the upper end of the cushioning body 6. When a downward movement is imparted to the post 7 the lower confining ring 8 wedges the lower end portion of the cushioning body 6 between the internally beveled face 9 and the post 7 and the upper confining ring 10 wedges the upper end portion of the cushioning body 6 between the beveled face 11 and the tube 2, as shown in Fig. 3.

By providing the internally and externally beveled faces on the confining rings, radial compression is applied to the ends of the rubber cushioning body as they are distorted by axial thrusts to progressively increase the resistance of the rubber body as the post is moved downwardly. The confining rings serve to stiffen the cushion and to set up stresses in the body of cushioning rubber which impart deflection characteristics desirable for cushioning severe impacts.

The post 7 has a recess 12 at its lower end which is of a diameter only slightly less than the external diameter of the post, so that a tubular skirt 13 is provided at the lower end of the post. The lower end portion 14 of the skirt 13 is of reduced external diameter to receive a stop collar 15 and the lower end thereof is flared to retain the collar 15 which serves to support a rubber buffer ring 16. The ring 16 is normally clamped between the under side of the lower retaining ring 8 and the collar 15 as shown in Fig. 2. Under impact thrusts, however, the post 7 moves downwardly, carrying the collar 15 and ring 16 away from the bottom of the ring 8 as shown in Fig. 3. Upon release of the downward thrust, the expansive thrust of the rubber cushion 6 moves the post upwardly bringing the buffer ring 16 into engagement with the ring 8, the rubber ring 16 serving as a rebound snubber to cushion the impact of the stop collar 15 against the ring 8.

In assembling the support, the lower confining ring 8 is positioned within the tube 2, and the post 7 with the rubber cushioning pad 6 and the upper confining ring 10 are assembled within the tube. Pressure is then exerted upon the post 7 to project the lower end thereof past the ring 8, after which the buffer ring 16 and collar 15 are placed upon the lower end of the post and the end portion 14 of the skirt is then swaged outwardly to secure the collar 15 to the post. It will be apparent that by properly positioning the confining rings 8 and 10 in the tube 2 and on the post 7, the rubber body 6 may be placed under an initial axial compression and that the positions in which the rings 8 and 10 are secured to the post and tube will determine the amount of initial axial compression of the rubber body.

In order to effectively cushion extreme impacts, an overload snubber may be provided in the form of an additional cushion interposed between the lower end of the post 7 and the bottom plate 3. As herein shown, the overload snubber is in the form of a rubber block 18 secured to the base member 1 centrally beneath the post 7. The diameter of the block 18 is slightly less than the diameter of the recess 12 at the lower end of the post 7 so that the block will expand and fill the recess in the bottom of the post when the impact of the post is imposed upon the block.

The axial movement of the post 7 in the tube 2 is limited in one direction by the collar 15 and buffer ring 16 and in the opposite direction by the buffer block 18, rebounds being snubbed by the collar 15 and buffer 16 and extreme impacts being snubbed by the cushioning pad 18.

The deflection characteristics of the cushioning sleeve 6 may be varied by changing the inclination or curvature of the beveled engaging faces 9 and 11 of the two confining rings, and the stiffness of the cushion may be regulated by positioning the confining rings 8 and 10 to provide the desired initial axial compression.

The ring 10 is accessible for adjustment after the device is assembled and when the device is in operation so that the stiffness of the cushion provided by the rubber bushing 6 may be increased or decreased to obtain the desired cushioning and vibration dampening characteristics.

The device of the present invention provides a very effective, heavy duty cushioning element, it being understood that a series of supports such as herein shown may be employed for supporting a machine or gun mount and that any suitable means may be provided for attaching the posts or tubes to the machine, gun mount or other structure carried by the supports. As herein shown the post 7 has a threaded extension 19 at its upper end adapted to be screwed into a threaded bore of a part 20 of the supported structure.

It is to be understood that variations and modifications of the specific device herein shown and described for purposes of illustration, may be made without departing from the spirit of the invention.

What I claim is:

1. A telescopic cushioning support comprising a base member, a tube mounted in upright position on said base member and having an open upper end, a lower confining ring secured to the interior of said tube intermediate the top and bottom thereof, a post of a diameter less than the internal diameter of said ring and telescopically mounted in said tube for vertical movement with its periphery spaced radially from the interior of said ring, an upper confining ring secured upon said post above the first ring, said second ring being of an external diameter less than the internal diameter of said tube and having its external periphery spaced radially from the interior of the tube, an axially yieldable cushion interposed between said post and tube and comprising a tubular body of rubber held under radial compression between the exterior of the post and the interior of the tube and having its ends engaging said rings, and an overload snubber comprising a resilient rubber buffer pad mounted on the base member beneath the lower end of said post.

2. A telescopic cushioning support comprising a base member, a tube mounted in upright position on said base member and having an open upper end, a lower confining ring secured to the interior of said tube intermediate the top and bottom thereof, a post of a diameter less than the internal diameter of said ring and telescopically mounted in said tube for vertical movement with its periphery spaced radially from the interior of said ring, an upper confining ring secured upon said post above the first ring, said second ring being of an external diameter less than the interial diameter of said tube and having its external periphery spaced radially from the interior of the tube, an axially yieldable cushion interposed between said post and tube and comprising a tubular body of rubber held under radial compression between the exterior of the post and the interior of the tube and having its ends engaging said rings, a rebound snubber comprising a stop collar mounted on the lower end of said post and engageable with the under side of the ring carried by the tube, and an overload snubber comprising a buffer pad interposed between the lower end of the post and the base member.

3. A telescopic cushioning support comprising a base member, a tube mounted in upright position on said member and having an open upper end, a lower confining ring secured in adjusted position to the interior of said tube intermediate the top and bottom thereof, said ring having an internally beveled top face, a post of a diameter less than the internal diameter of said ring and telescopically mounted in said tube for vertical movement with its periphery spaced radially from the interior of said ring, an upper confining ring secured to the exterior of the post above the first ring, said upper ring being of an external diameter less than the internal diameter of said tube and having its external periphery spaced radially from the interior of the tube, said upper ring having an externally beveled bottom face, an axially yieldable cushion interposed between said post and tube and comprising a tubular body of rubber held under radial compression between the exterior of the post and the interior of the tube and having its ends engaging said internally and externally beveled faces of the upper and lower rings, and a rebound snubber comprising a stop collar mounted on the lower end of said post and a rubber buffer ring interposed between said collar and said lower ring.

4. A telescopic cushioning support comprising a base member, a tube mounted in upright position on said member and having an open upper end, a lower confining ring secured in adjusted position to the interior of said tube intermediate the top and bottom thereof, said ring having an internally beveled top face, a post of a diameter less than the internal diameter of said ring and telescopically mounted in said tube for vertical movement with its periphery spaced radially from the interior of said ring, an upper confining ring secured to the exterior of the post above the first ring, said upper ring being of an external diameter less than the internal diameter of said tube and having its external periphery spaced radially from the interior of the tube, said upper ring having an externally beveled bottom face, an axially yieldable cushion interposed between said post and tube and comprising a tubular body of rubber held under radial compression between the exterior of the post and the interior of the tube and having its ends engaging said internally and externally beveled faces of the upper and lower rings, a rebound snubber comprising a stop collar mounted on the lower end of said post and a rubber buffer ring interposed between said collar and said lower ring, and an overload snubber comprising a rubber buffer pad interposed between the lower end of said post and said base member.

5. A telescopic cushioning support comprising a base member, an upright tube mounted on the base member and having an open upper end, a lower confining ring secured to the interior of said tube intermediate the upper and lower ends thereof, a post mounted centrally of said tube and movable vertically within said lower ring, an upper confining ring secured upon said post and movable vertically with the post within the top portion of the tube, a tubular body of rubber held under radial compression between the exterior of the post and the interior of the tube and interposed between said rings, a rebound snubber comprising a collar attached to the lower end of said post and underlying said lower ring, and an overload snubber comprising a rubber buffer block attached to the base beneath the lower end of said post.

LEON F. THIRY.